（12） United States Patent
Kourogi et al.

(10) Patent No.: US 8,983,124 B2
(45) Date of Patent: Mar. 17, 2015

(54) MOVING BODY POSITIONING DEVICE

(75) Inventors: Masakatsu Kourogi, Ibaraki (JP);
Tomoya Ishikawa, Ibaraki (JP); Takeshi Kurata, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 336 days.

(21) Appl. No.: 13/512,696

(22) PCT Filed: Dec. 3, 2010

(86) PCT No.: PCT/JP2010/071637
§ 371 (c)(1),
(2), (4) Date: May 30, 2012

(87) PCT Pub. No.: WO2011/068184
PCT Pub. Date: Jun. 9, 2011

(65) Prior Publication Data
US 2012/0237086 A1    Sep. 20, 2012

(30) Foreign Application Priority Data

Dec. 3, 2009   (JP) .................................. 2009-275754

(51) Int. Cl.
G06K 9/00   (2006.01)
G08B 1/08   (2006.01)
(Continued)

(52) U.S. Cl.
CPC ................. *G01C 21/20* (2013.01); *G01S 11/12* (2013.01); *G08G 1/005* (2013.01); *G06K 9/00348* (2013.01)
USPC ..................................... 382/103; 340/539.13

(58) Field of Classification Search
None
See application file for complete search history.

(56) References Cited

U.S. PATENT DOCUMENTS 5,828,306 A * 10/1998 Curran ........................ 340/573.4
5,892,454 A *  4/1999 Schipper et al. ........... 340/573.4
(Continued)

FOREIGN PATENT DOCUMENTS

JP    2004005511 A  *  1/2004  ............. G08B 13/22
JP    2004007496 A  *  1/2004  ............... H04Q 7/34
(Continued)

OTHER PUBLICATIONS

"Hybrid Inertial and Vision Tracking for Augmented Reality registration," You, et al, Virtual Reality, 1999. Proceedings., IEEE, Mar. 13-17, 1999, pp. 260-267.*
(Continued)

*Primary Examiner* — Wenpeng Chen
(74) *Attorney, Agent, or Firm* — Renner, Otto, Boisselle & Sklar, LLP

(57)   ABSTRACT

A moving body positioning device includes a sensor group that outputs a motion velocity vector of a moving body, a motion velocity vector estimation processing device that measures a motion velocity vector and outputs an output sequence of the motion velocity vector together with a measured time, a monitoring camera, an image analysis processing device that analyzes the image of the monitoring camera to measure a position of feet of the moving body measures a motion velocity vector at the position of the feet, and outputs an output sequence of the motion velocity vector with a measured time, and a motion velocity vector collation processing device that collates the output sequence of the motion velocity vector estimation processing device with the output sequence of the image analysis processing device and outputs its collation result as a TRUE or a FALSE signal.

4 Claims, 10 Drawing Sheets

(51) Int. Cl.
*G01C 21/20* (2006.01)
*G01S 11/12* (2006.01)
*G08G 1/005* (2006.01)

(56) References Cited

U.S. PATENT DOCUMENTS

| | | | |
|---|---|---|---|
| 6,330,356 B1 * | 12/2001 | Sundareswaran et al. | 382/154 |
| 6,681,629 B2 * | 1/2004 | Foxlin et al. | 73/488 |
| 7,123,126 B2 * | 10/2006 | Tanaka et al. | 340/5.2 |
| 7,319,479 B1 * | 1/2008 | Crabtree et al. | 348/169 |
| 8,761,434 B2 * | 6/2014 | Marks et al. | 382/103 |
| 2002/0019258 A1 * | 2/2002 | Kim et al. | 463/36 |
| 2003/0045816 A1 * | 3/2003 | Foxlin | 600/595 |
| 2003/0197612 A1 * | 10/2003 | Tanaka et al. | 340/572.1 |
| 2003/0234725 A1 * | 12/2003 | Lemelson et al. | 340/521 |
| 2004/0105573 A1 * | 6/2004 | Neumann et al. | 382/103 |
| 2005/0197769 A1 * | 9/2005 | Soehren et al. | 701/220 |
| 2005/0254687 A1 | 11/2005 | Asama et al. | |
| 2006/0212570 A1 * | 9/2006 | Aritsuka et al. | 709/224 |
| 2007/0081695 A1 * | 4/2007 | Foxlin et al. | 382/103 |
| 2008/0062120 A1 * | 3/2008 | Wheeler et al. | 345/156 |
| 2009/0209343 A1 * | 8/2009 | Foxlin et al. | 463/36 |
| 2009/0231436 A1 * | 9/2009 | Faltesek et al. | 348/169 |
| 2013/0100268 A1 * | 4/2013 | Mihailidis et al. | 348/77 |
| 2014/0104059 A1 * | 4/2014 | Tran | 340/539.12 |

FOREIGN PATENT DOCUMENTS

| | | | | |
|---|---|---|---|---|
| JP | 2004-096501 A | 3/2004 | | |
| JP | 2004-219332 A | 8/2004 | | |
| JP | 2004274101 A * | 9/2004 | | H04N 7/18 |
| JP | 2005-275912 A | 10/2005 | | |
| JP | 2008-16042 A | 1/2008 | | |
| JP | 2008-026272 A | 2/2008 | | |
| JP | 2008090861 A * | 4/2008 | | |
| WO | 2009/007917 A2 | 1/2009 | | |

OTHER PUBLICATIONS

International Search Report for corresponding International Application No. PCT/JP2010/071637 mailed Mar. 1, 2011.

Kourogi et al., "Indoor Positioning System using a Self-Contained Sensor Module for Pedestrian Navigation and Its Evaluation", The proceedings of Symposium on Mobile Interactions, pp. 151-156, 2008 and partial English translation.

E. Foxlin, "Pedestrian Tracking with Shoe-Mounted Inertial Sensors", IEEE Computer Graphics and Applications, vol. 25, No. 6, pp. 38-46, 2005.

Ishikawa et al., "Interactive 3D Indoor Modeler with a Camera and Self-Contained Sensors", The Institute of Electronics, Information and Communication Engineers, IEICE Technical Report, vol. 14, CS-3, pp. 65-70, 2009 and partial English translation.

Taniguchi et al., "Identification and Tracking of User Carrying Portable GPS Terminal in Surveillance Video", IPSJ SIG Technical Report, 2006-CVIM-153, pp. 315-320, 2006 and partial English translation.

* cited by examiner

F I G. 1
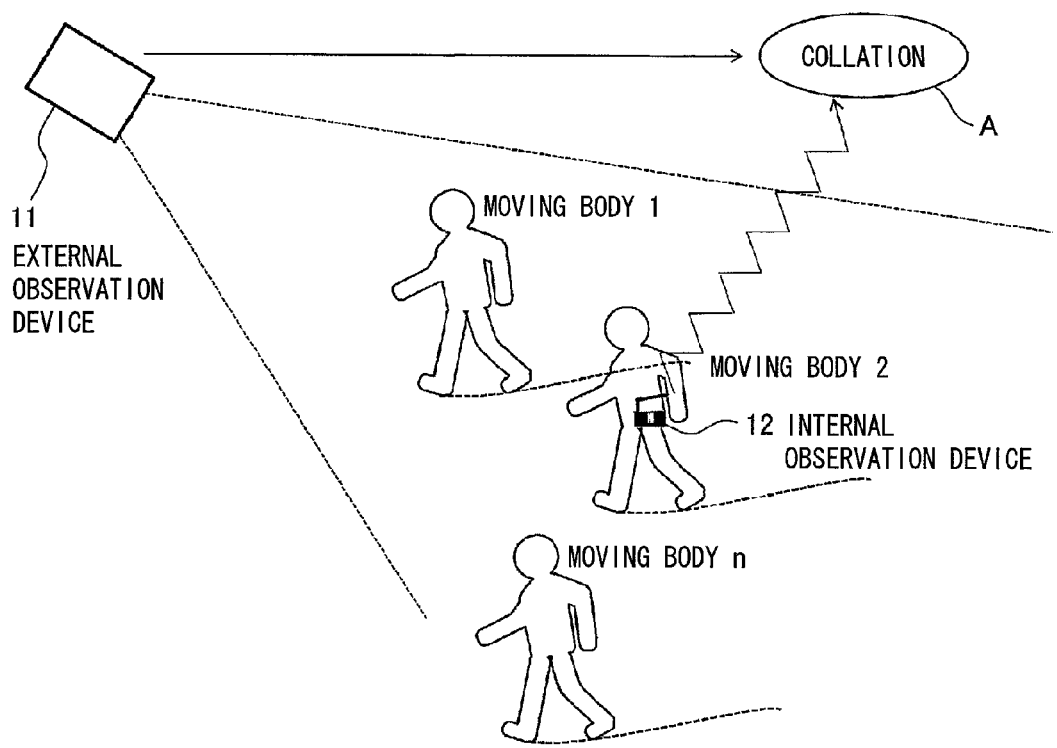

F I G. 2
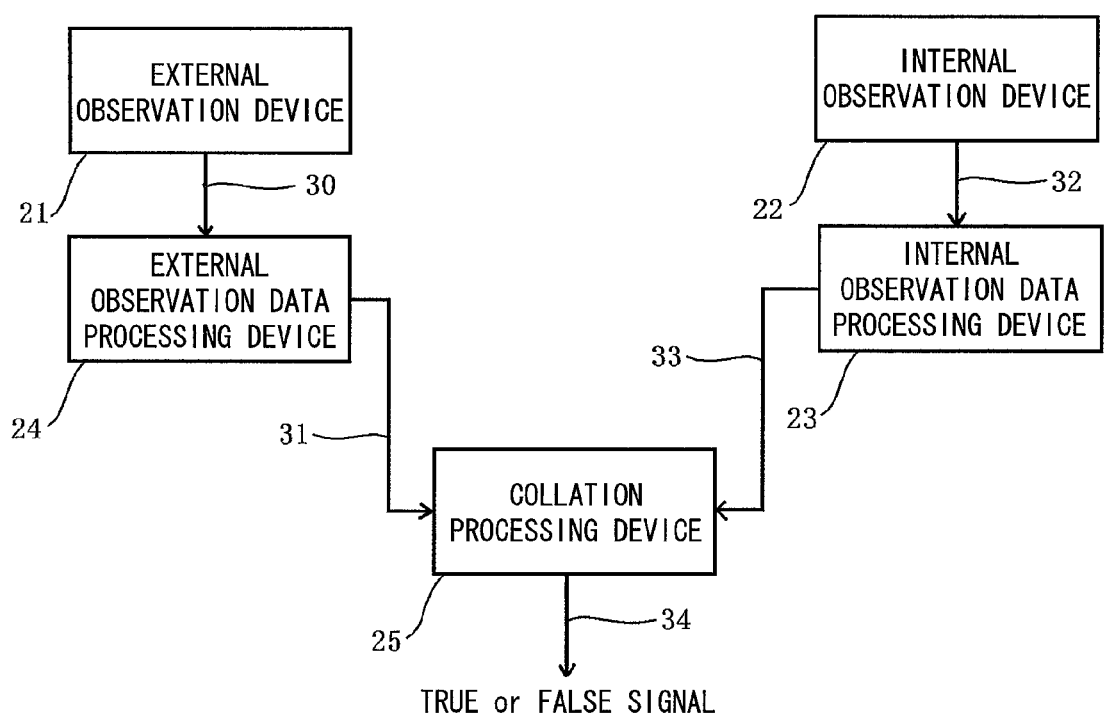

F I G. 4
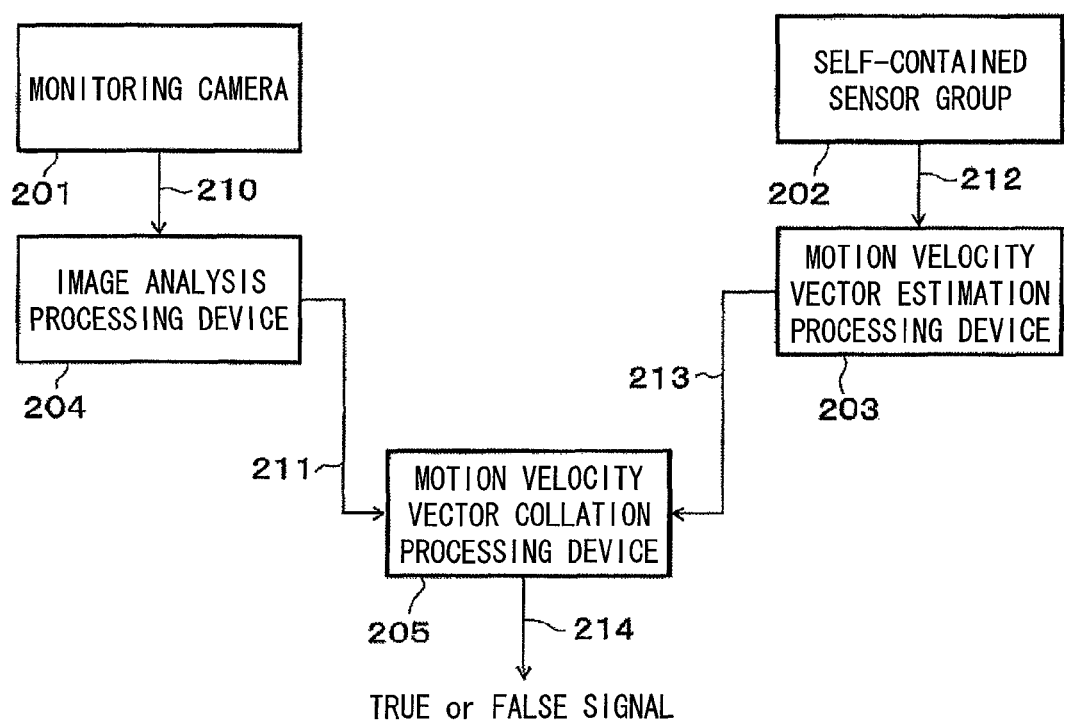

F I G. 5
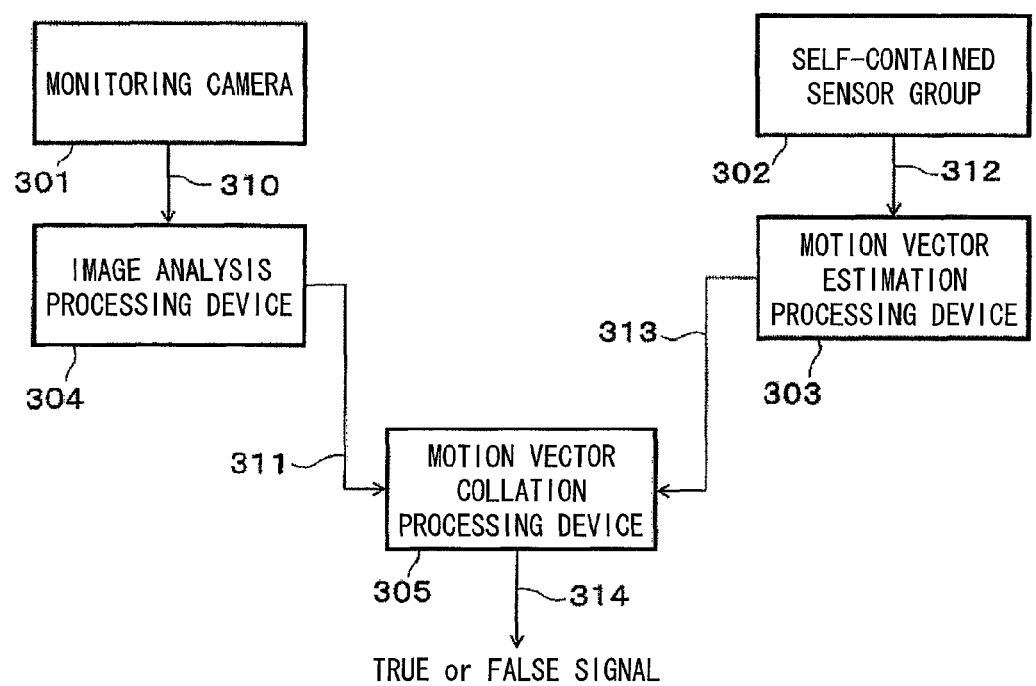

F I G. 1 0
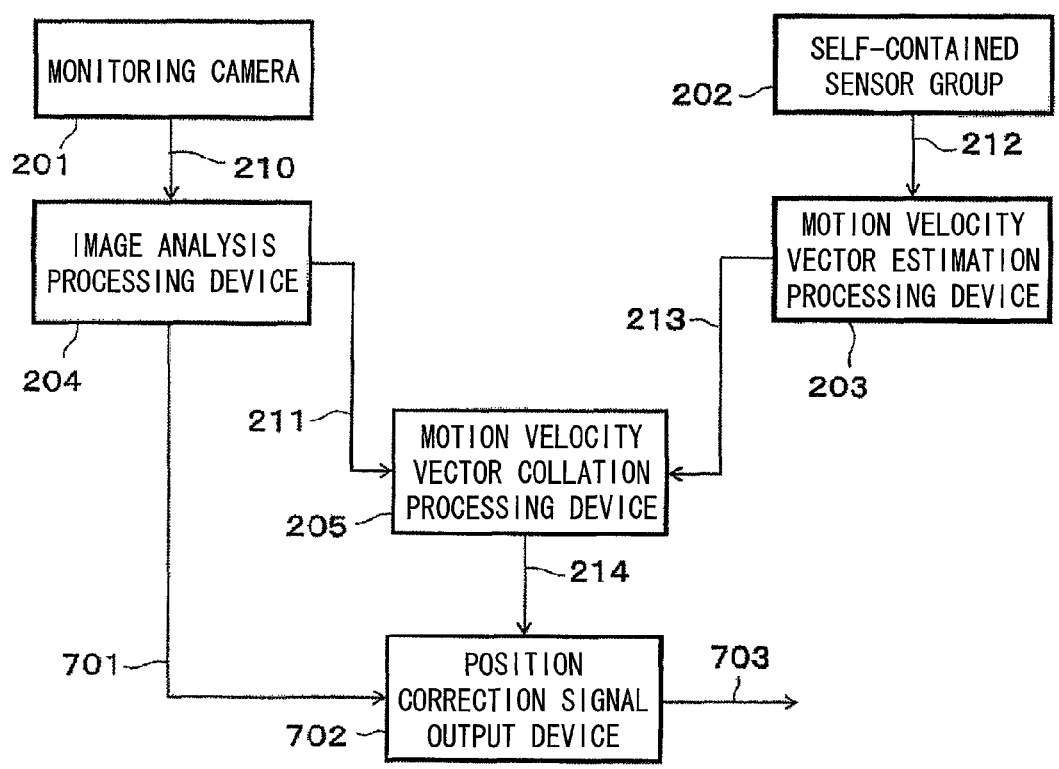

MOVING BODY POSITIONING DEVICE

TECHNICAL FIELD

The present invention relates to a moving body positioning device serving as an essential element for monitoring and tracking a moving body, which moving body positioning device uses an external monitoring camera.

BACKGROUND ART

A technology for measuring a position and direction specialized in walking movements of a human being as a pedestrian, with use of self-contained sensors (e.g. acceleration, gyro, magnetic, pressure sensors) worn on the hips, toes and the like of the human being is called Pedestrian Dead Reckoning (PDR), and has been well studied from the past (Non Patent Literature 1).

In PDR, outputs of the self-contained sensors are analyzed in view of constraints in the walking movements of the human being, and a motion vector or a motion velocity vector of the pedestrian is estimated one by one and are accumulated.

CITATION LIST

Non Patent Literature

Non Patent Literature 1
Masakatsu Kourogi, Takashi Okuma, Takeshi Kurata, "*Hokosha Nabi no tame no Jizo Sensa Moju-ru wo Mochiita Okunaisokui Shisutemu to sono Hyoka*" (Indoor positioning system using self-contained sensor modules for pedestrian navigation, and its evaluation), Symposium "Mobile 08" Reviews, pp. 151-156, 2008

Non Patent Literature 2
E. Foxlin, "Pedestrian Tracking with Shoe-Mounted Inertial Sensors", IEEE Computer Graphics and Applications, vol. 25, no. 6, pp. 38-46, 2005.

Non Patent Literature 3
Tomoya Ishikawa, Thangamani Kalaivani, Masakatsu Kourogi, Andrew P. Gee, Walterio Mayol, Keechul Jung, Takeshi Kurata, "*Kamera to Jizo Sensa Moju-ru wo heiyou shita Intarakuthibu 3 jigen Okunai Kankyou Modera*" (Interactive three-dimensional indoor environment modeler with use of a camera and self-contained sensor module), Nihon VR Gakkai Kenkyu Houkoku, Vol. 14, CS-3, pp. 65-70, 2009

Non Patent Literature 4
Taniguchi, Nishio, Toriyama, Babaguchi, Hagita, "*Kanshi Kamera Eizou ni okeru GPS Tanmatsu Keitai Yu-za no Doutei to Tsuiseki* (Identification and tracking of GPS terminal portable user in a monitoring camera image), Johoshorigakkai CVIM Kenkyu Houkoku, 2006-CVIM-153, pp. 315-320, 2006

SUMMARY OF INVENTION

Technical Problem

In relation to technical development of PDR, the following issues are to be further solved in order to make PDR more practical.

A first problem is that in a position/direction measurement device based on PDR, its measurement error gradually accumulates in the course of motion.

Secondly, as also described in Non Patent Literature 1, with PDR, motion velocity estimated based on individual difference between pedestrians vary by a certain degree, and it is necessary to find an individual difference parameter to appropriately correct this variation. It is possible to estimate an individual difference parameter by having the pedestrian carry out a calibration operation in advance; this procedure is complex however, and serves as a problem in practical use.

Thirdly, in solving the first and second problems based on the image captured by the monitoring camera, a human figure inside the image captured by the monitoring camera needs to be associated with the human figure that the PDR is tracking. However, with the techniques currently available, it is difficult to steadily achieve such an associated state.

An object of the present invention is to provide a moving body positioning device serving as an essential element when monitoring and tracking a moving body, which moving body positioning device is accomplished to solve such problems and which uses an external monitoring camera.

Solution to Problem

In order to attain such an object, the moving body positioning device according to the present invention solves the first problem of the accumulation of measurement error by PDR, by correcting a PDR measurement result by combining (i) an analysis result of an image obtained by a monitoring camera externally provided, with (ii) the PDR measurement result. Namely, a human figure inside the image of the monitoring camera is made associated with the human figure that PDR is to track, and a position of PDR is corrected to a position of the human figure in the image of the monitoring camera.

Moreover, regarding the second problem of estimating the individual difference parameters of a pedestrian, the moving body positioning device according to the present invention is capable of tracking a position of a human figure in the image by analyzing the image of the monitoring camera, and estimating its motion velocity vector. Hence, the individual difference parameter is estimated by analyzing this result and PDR sensor data.

Moreover, the moving body positioning device according to the present invention solves the third problem of associating the human figure in the image of the monitoring camera with the human figure that the PDR tracks by following procedures described below. Namely, first, an image of a monitoring camera whose location relationship with a floor surface on which a pedestrian moves is well known is analyzed, to allow focusing on a difference image with the background. Thereafter, a human figure image in the foreground is cut out, and positions of the head and feet of that human figure are estimated. Next, by tracking the position of the feet one by one, a motion velocity vector or a motion vector is estimated. This motion velocity vector or motion vector is collated with a motion velocity vector or a motion vector that the PDR outputs, to associate the PDR output with the human figure that the monitoring camera tracks.

As a configuration of the present invention, a moving body positioning device of the present invention includes: an internal observation device provided to a moving body, to measure and output a motion of the moving body; an internal observation data processing device that estimates a motion of the moving body based on the output from the internal observation device; an external observation device that observes motion of a plurality of moving bodies; an external observation data processing device that estimates a motion of the moving body from an observation result by the external observation device; and a collation processing device that collates an output from the internal observation data processing device with that of the external observation data processing device, and outputs its collation result as a TRUE signal or a FALSE signal.

More specifically, the moving body positioning device according to the present invention includes: a self-contained sensor group that outputs a motion velocity vector of the moving body with use of an acceleration sensor provided in the moving body; a motion velocity vector estimation processing device that measures a motion velocity vector based on the output of the self-contained sensor group, and outputs an output sequence of the motion velocity vector together with a measured time; a monitoring camera for externally image capturing the moving bodies; an image analysis processing device that analyzes an image of the monitoring camera to measure a position of feet of the moving body in the image to measure a motion velocity vector of that position of the feet, and outputs an output sequence of the motion velocity vector together with a measured time, and a motion velocity vector collation processing device that collates the output sequence of the motion velocity vector estimation processing device with the output sequence of the image analysis processing device, and outputs its collation result as a TRUE signal or a FALSE signal.

Moreover, the moving body positioning device according to the present invention includes, as its configuration: a self-contained sensor group that outputs a motion vector of the moving body, the motion vector being obtained by integrating a motion velocity vector with use of an acceleration sensor provided in the moving body; a motion vector estimation processing device that measures a motion vector based on an output of the self-contained sensor group and outputs an output sequence of the motion vector together with a measured time; a monitoring camera for externally image capturing the moving bodies; an image analysis processing device that analyzes an image of the monitoring camera to measure a position of feet of the moving body in the image to measure a motion vector of that position of the feet, and outputs an output sequence of the motion vector together with a measured time; and a motion vector collation processing device that collates the output sequence of the motion vector estimation processing device with the output sequence of the image analysis processing device, and outputs its collation result as a TRUE signal or a FALSE signal.

Moreover, the moving body positioning device according to the present invention includes, as its configuration: a self-contained sensor group that outputs a motion vector of the moving body, the motion vector being obtained by integrating a motion velocity vector with use of an acceleration sensor provided in the moving body; a self-contained sensor base motion identification processing device that identifies a movement kind of the moving body in accordance with an output of the self-contained sensor group, and outputs an identification result together with a measured time; a monitoring camera for externally image capturing the moving bodies; an image analysis processing device that analyzes an image of the monitoring camera to identify the movement kind of the moving body in the image and outputs its identification result together with a measured time; and the collation processing device is a movement kind collation processing device that collates the output of the self-contained sensor base motion identification processing device with the output of the image analysis processing device, and outputs its collation result as a TRUE signal or a FALSE signal.

Moreover, in the moving body positioning device according to the present invention, when the motion velocity vector collation processing device collates the output sequence from the motion velocity vector estimation processing device with the output sequence from the image analysis processing device, the motion velocity vector collation processing device determines a weighting factor in accordance with a size of an area of a unit pixel of the image of the monitoring camera projected on a floor surface at the position of the feet of the moving body estimated from the image of the monitoring camera, to carry out the collation process. This is similarly carried out in a case in which the motion vector collation processing device collates the output sequence from the motion vector estimation processing device with the output sequence from the image analysis processing device. Moreover, in this case, in the collation process, the weighting factor is made smaller as the area of the unit pixel is projected larger, and the weighting factor is made larger as the area of the unit pixel is projected smaller.

Moreover, as another feature, the moving body positioning device of the present invention further includes a position correction signal output device, when the motion velocity vector collation processing device outputs the TRUE signal, the position correction signal output device outputting a signal that corrects a positional coordinate of the moving body to a position of the moving body wearing the self-contained sensor group, the positional coordinate being outputted from the image analysis processing device.

As yet another feature, the moving body positioning device of the present invention further includes a walking parameter estimation processing device, the motion velocity vector estimation processing device correcting and outputting the output sequence of the motion velocity vector in accordance with an individual difference parameter set in advance, and when the motion velocity vector collation processing device outputs the TRUE signal, the walking parameter estimation processing device resetting the individual difference parameter in the motion velocity vector estimation processing device with use of pair information of time series data of a collated motion velocity vector and an output sequence of sensor data of the self-contained sensor.

Moreover, the moving body positioning device according to the present invention further includes an identification information storage/display device that stores and displays identification information identifying the moving body, when the motion velocity vector collation processing device outputs the TRUE signal, the identification information storage/display device storing and displaying, as information indicative of the moving body in the image of the monitoring camera, the identification information of a moving body that wears the self-contained sensor, and when the motion velocity vector collation processing device outputs the FALSE signal, the identification information storage/display device storing and displaying, as information indicative of the moving body in the image of the monitoring camera, the identification information indicating that no self-contained sensor is worn.

Advantageous Effects of Invention

With use of the moving body positioning device of the present invention including the foregoing features, when a person (moving body) wearing for example PDR sensors (an internal observation device and a self-contained sensor group of positioning devices) enters into an image of for example a monitoring camera (an external observation device), an estimation result of a position of the wearing person (moving body) can be corrected based on an analysis result of that image. Hence, no measurement error of the position/direction caused by the PDR is accumulated together with movement of the moving body, as like in the conventional art.

Moreover, by using the moving body positioning device of the present invention, in a case in which a person wearing for example the PDR sensors (an internal observation device and a self-contained sensor group of the positioning device) is in the image of for example the monitoring camera (an external observation device), it is possible to estimate a motion velocity of the wearing person (moving body) based on that image. By associating this with the PDR sensor data based on this result, it is possible to estimate an individual difference parameter of the wearing person. With use of this estimated individual difference parameter, it is possible to carry out a calibration operation in advance.

BRIEF DESCRIPTION OF DRAWINGS

FIG. 1 is a view schematically illustrating a moving body positioning device according to the present invention.

FIG. 2 is a block diagram illustrating basic processing elements of the moving body positioning device according to the present invention.

FIG. 4 is a block diagram illustrating a configuration of another embodiment of the moving body positioning device according to the present invention.

FIG. 5 is a block diagram illustrating a configuration of another embodiment of the moving body positioning device according to the present invention.

FIG. 10 is a block diagram illustrating a configuration of another embodiment of the moving body positioning device of the present invention.

DESCRIPTION OF EMBODIMENTS

Figure 3:
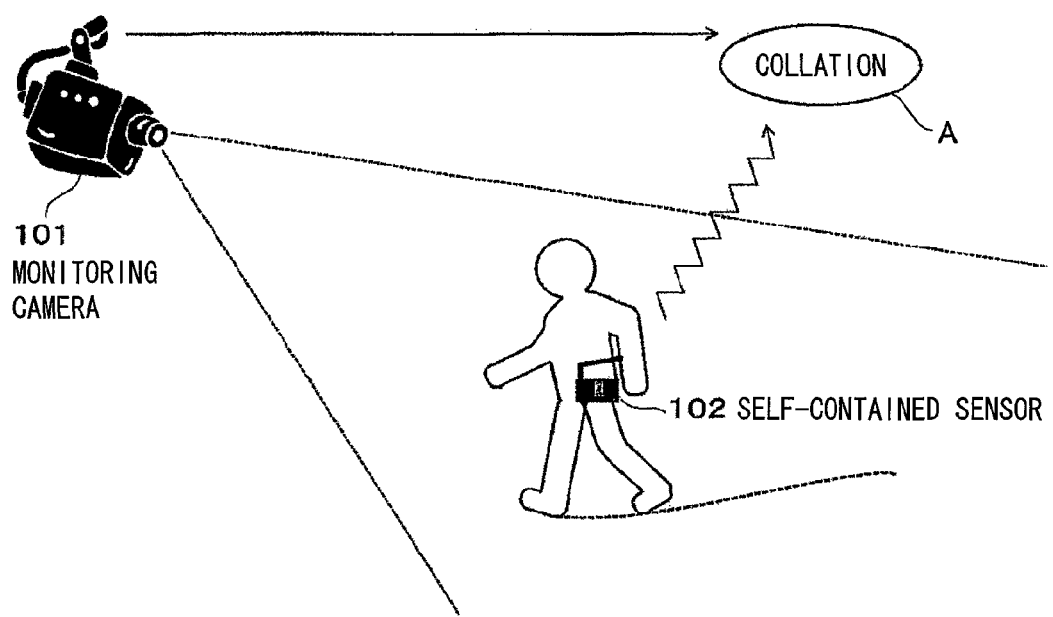
FIG. 3 is a view illustrating another embodiment of the moving body positioning device according to the present invention.

Described below is an embodiment of a moving body positioning device of the present invention, with reference to drawings. FIG. 1 is a view schematically illustrating a moving body positioning device according to the present invention, and FIG. 2 is a block diagram illustrating a configuration of basic processing elements of the moving body positioning device according to the present invention.

An external observation device 11 in FIG. 1 is a device that can observe movements of a plurality of moving bodies in a predetermined space (external world) such as a road, an open space, a surface of the ocean or the like. Examples of the external observation device 11 include a monitoring camera, a Z-value sensor, a laser range finder and the like. An internal observation device 12 is a device worn on a moving body, and measures motion of the moving body. Examples of the internal observation device 12 are combinations of (i) a sensor that measures movement such as an acceleration sensor, a magnetic sensor, an angular velocity sensor, or a pressure sensor and (ii) a clock. As the sensor that measures movement, a temperature sensor may be combined with the acceleration sensor, the magnetic sensor, the angular velocity sensor, or the pressure sensor. Examples of the moving body encompass a pedestrian, a bicycle, an automobile, an airplane, and a ship.

The external observation device 11 observes each of moving bodies wearing the internal observation device 12 (in the example of FIG. 1, a moving body 2 being a pedestrian) and a moving body 1 (similarly in this example, a pedestrian) not wearing the internal observation device 12 or not sending out information of the internal observation device 12 although the moving body is wearing the internal observation device 12. At this time, movement of each of the plurality of moving bodies that is to be observed is estimated for every discrete time based on a motion velocity vector, motion vector, motion identification and the like.

For example, when the external observation device 11 is a monitoring camera that image captures a moving body, the movement of the moving body can be estimated by tracing the moving body in the image of the monitoring camera as appropriate by its shape, color and the like, and combining this with a motion velocity vector estimation processing device that estimates a motion velocity vector of the moving body.

Moreover, the movement of the moving body can be estimated by use of a sensor that measures a depth (Z value) of the external world as the external observation device 11, and combining this with a Z-value analysis device that detects a moving body which is the subject to be image captured and estimates its motion velocity vector depending on its depth. The sensor for measuring the Z value may be a depth measurement device using a stereo camera in a case of a passive sensor, and may be a device which measures a distance (Z-value) by emitting infrared light and measuring a time required for the infrared light to reflect back, in a case of an active sensor.

Alternatively, the movement of the moving body can be estimated by using a Laser Range Finder (LRF) as the external observation device 11, which LRF emits a laser beam to the external world and measures a distance from the moving body based on its reflected light, and combine therewith an analysis device that detects the moving body based on the measurement result of that distance and estimates its motion velocity vector.

Meanwhile, the internal observation device 12 estimates the movement of the moving body that wears the internal observation device 12, for every discrete time based on the motion velocity vector, the motion vector, the motion identification and the like. Time series data of the motion velocity vector observed in each of the external world and the internal world is collected to one location by communications means (e.g., with use of wireless data communications network). At that location, a collation process (A) is carried out to the time series data of the motion velocity vector of at least one of the moving bodies that the external observation device 11 captures, with the motion velocity vector outputted by the internal observation device 12, and when the collation is successful and is deemed as a time series of a motion velocity vector of an identical moving body, a TRUE signal is outputted, and for any other cases, a FALSE signal is outputted.

FIG. 2 is a block diagram illustrating a configuration of basic processing elements in the moving body positioning device according to the present invention. The external observation device 21 is a device similar to the external observation device 11 of FIG. 1, and detects at least one moving body and outputs its result together with time data. Output data 30 differs depending on a used external observation device; for example, when a camera is used, the output data 30 is image data with time, when the Z-value sensor is used, the output data 30 is a collection of Z values with time, and when the laser range finder is used, the output data 30 is a collection of distance data with time. An external observation data processing device 24 is a device that detects a moving body based on the output data 30 and outputs time series data of its motion velocity vector, motion vector, or motion identification result of the moving body; more specifically, is a computer including a memory, a processor, and an input/output interface. This can be achieved by, for example, a process of detecting a subject moving body (e.g. a human figure) based on features such as shape and color, in image analysis.

The internal observation device 22 is, as illustrated in FIG. 1, a device that is worn on a moving body to measure its motion, similarly to the internal observation device 21 of FIG. 1. The internal observation device 22 is achievable by, for example, use of a self-contained sensor (a combination of acceleration, magnetic, angular velocity, pressure, and temperature sensor) with a clock (real-time clock, etc.). The internal observation data processing device 23 is a device which, in a case in which the motion velocity vector is to be estimated, obtains an acceleration vector fixed to a (three-dimensional) world coordinate system based on a time-attached output from the self-contained sensor, and estimates the motion velocity vector by its acceleration integral, and more specifically is a computer having a memory, a processor, and an input/output interface. Moreover, in a case in which the moving body is limited to just pedestrians, it is achievable by estimating the motion velocity vector by the method of PDR (Pedestrian Dead Reckoning). The internal observation data processing device 23 outputs time series data (33) of the motion velocity vector or motion vector of the moving body wearing the internal observation device 22, or a motion identification result of the moving body.

Finally, the collation processing device 25 collates (a) the time series data (31) of the motion velocity vector, motion vector, or motion identification result of the moving body related to one moving body obtained based on the external observation device 21 with (b) the time series data (33) of the motion velocity vector, motion vector or motion identification result of the moving body obtained based on the internal observation device 22, and in a case in which the two can be collated, the collation processing device 25 outputs a TRUE signal, and in other cases, outputs a FALSE signal (34). Moreover, the collation processing device 25 is also a computer including a memory, a processor, and an input/output interface, and carries out the collation process of data received from the external observation data processing device and the internal observation data processing device with use of the processor.

For example, in a case of collating the time series data of the motion velocity vector, a distance scale between the time series data of the motion velocity vectors is set beforehand based on the time series data (31) of the motion velocity vector and the time series data (33) of the motion velocity vector obtained in accordance with the internal observation device 22; when this distance scale is not more than a set threshold, the two motion velocity vectors are determined as being collated and thus a TRUE signal is outputted, whereas in any other case, a FALSE signal is outputted (34). Note that, as the distance scale described before, a distance scale that allows for a certain jitter (time difference) to be present in the time data held by the two time series data is selected and used.

FIG. 3 illustrates a state in which a monitoring camera 101 is provided in a known disposition relationship with the floor surface, and the image captured by the monitoring camera 101 includes a path, an open space or the like where people often pass. The self-contained sensor 102 is a collection of sensors that can operate without external infrastructure; as the self-contained sensor 102, an acceleration sensor, a gyro sensor, a magnetic sensor, a pressure sensor or the like may be used for example.

Here, with the monitoring camera 101, when an environment model is generated upon appropriately setting a scale, a translation and rotation movement parameter with respect to an external environment in which the monitoring camera 101 is provided and a camera parameter constituted of a focus distance and scale coefficient are found by carrying out the following procedures. Such an environment model can be generated interactively by executing a modeler application program (modeler application) with use of a method described in Non Patent Literature 3 or the like. As described in Non Patent Literature 3, procedures are carried out for finding a vanishing point in the environment based on an instruction by the user, with use of the modeler application described before (more specifically, the user selects a pair of two parallel straight lines in the environment).

FIG. 3 illustrates a state in which a pedestrian, who is a moving body wearing the self-contained sensor 102, is detected as being included and moving in the image of the monitoring camera 101, and a process (A) of collating the human figure in the image of the monitoring camera 101 with the pedestrian wearing the self-contained sensor 102 is carried out.

In FIG. 4, 201 is a monitoring camera, 202 is a self-contained sensor group, 203 is a motion velocity vector estimation processing device, 204 is an image analysis processing device, and 205 is a motion velocity vector collation processing device. With the configuration including these processing components, the image of the monitoring camera is collated with the output of the self-contained sensor, to output a TRUE or a FALSE signal.

The image (frame image of each time) captured by the monitoring camera 201 is outputted to the image analysis processing device 204. Here, candidates of figures of the human figure of the moving body is selected, positions of their feet are estimated, and motion velocity vector of each time is estimated by time integrals of the positions, to output an output sequence of the motion velocity vector. Note that the estimation of the motion velocity vector can be carried out by obtaining data with, instead of the monitoring camera, a depth measurement device with use of a stereo camera, or a laser range finder. Hereinafter, the moving body is described as a human figure.

In the embodiment, 210 is information of each of frame images of the image of the monitoring camera, and 211 is information of a result of analyzing the frame images. In a case in which a human figure is present in the image, data indicative of a positional coordinate of a floor surface on which the feet of the human figure is present is outputted as the information 211 of the analysis result, and in a case in which no human figure is included, data indicative of a signal of that fact is outputted as the information 211 of the analysis result.

On the other hand, the output data 212 of the self-contained sensor group 202 is outputted to the motion velocity vector estimation processing device 203; based on the output data (acceleration vector, angular velocity vector, magnetic vector, pressure data) of the self-contained sensor group 202, the motion velocity vector of the wearing person (human figure) for each of the times is estimated.

The output data 212 is, as described above, an output of sensor data from the sensor included in the self-contained sensor group 202. The self-contained sensor group 202 includes a timer, and an acceleration vector, angular velocity vector, magnetic vector, and pressure data, each having time stamp information obtained by the timer, are outputted from the self-contained sensor group 202. Calculation of the motion velocity vector based on the sensor data of the output data 212 of the self-contained sensor group 202 is, for example, carried out by processing data in the method described in Non Patent Literature 1. Data 213 outputted from the motion velocity vector estimation processing device 203 is data of an output sequence of a motion velocity vector of a moving body (human figure) that wears the self-contained sensor group 202.

The motion velocity vector collation device 205 accumulates the output sequences of the motion velocity vector outputted from the image analysis processing device 204 and the output sequences of the motion velocity vector outputted from the motion velocity vector estimation processing device 203 for a certain time and compares the two, to determine whether or not these output sequences match each other. The data processing of this determination is, as disclosed in Non Patent Literature 4, a data processing in which a total of magnitudes of a difference vector between the two motion velocity vectors are calculated and thereafter this total is normalized with a length of time or a sample number; the normalized total is compared with a predetermined threshold, and is determined as being collated in the case in which the normalized total is not more than the threshold.

The time series data of the motion velocity vector estimated by the motion velocity vector estimation processing device 203 based on the sensor data of the self-contained sensor group 202 is collated with the motion velocity vector estimated from the positional coordinates of the feet of the human figure in the image obtained as an analysis result of the frame images from the monitoring camera 201 by the image analysis processing device 204, and as its result, in a case in which the two collate with each other, a signal indicative of TRUE is outputted as the output data 214 outputted from the motion velocity vector collation device 205, and in a case in which the two do not collate with each other, a signal indicative of FALSE is outputted as the output data 214 outputted from the motion velocity vector collation device 205.

The moving body positioning device of the embodiment described above carries out the collation process based on the output sequence of the motion velocity vector, however it is also possible to carry out the collation process based on a motion vector (i.e. relative positional vector) instead of collating with the motion velocity vector. An embodiment with such a configuration is described below.

FIG. 5 is a block diagram describing a configuration of another embodiment of the moving body positioning device of the present invention. In FIG. 5, 301 is a monitoring camera, 302 is a self-contained sensor group, 303 is a motion vector estimation processing device, 304 is an image analysis processing device, and 305 is a motion vector collation processing device. The monitoring camera 301 is as with the monitoring camera 201 in FIG. 4. The monitoring camera 301 outputs a frame image signal 310. The image analysis processing device 304, upon receiving the frame image signal 310 and determining that a human figure (moving body) is present inside the frame image, outputs an output sequence of the motion vector 311 of that human figure.

On the other hand, the self-contained sensor group 302 is as with the self-contained sensor group 202 in FIG. 4. The output data 312 outputted from the self-contained sensor group 302 is an output sequence of sensor data such as an acceleration vector, an angular velocity vector, a magnetic vector, and pressure data, each to which a time stamp is added. The motion vector estimation processing device 303, when receiving such sensor data of the output data 312 from the self-contained sensor group 302 as its input, estimates and outputs a relative motion vector of a person (moving body) wearing the self-contained sensor based on data processing such as carrying out integral processing of a velocity vector. For such estimation processing of a motion vector, it is possible to utilize, for example, data processing of calculating the motion vector by estimating a motion velocity and carrying out first order integral related to that time, as described in Non Patent Literature 1, and so thus the data processing of this method is used. The motion vector estimation processing device 303 outputs output data 313 of the output sequence of the calculated relative motion velocity vector.

The motion vector collation processing device 305 collates the time series data of the output data 311 of the motion vector obtained by the image analysis processing with the time series data of the output data 313 of the relative motion vector obtained by the motion vector estimation processing based on the sensor data. The time series data of the two motion vectors are collated by performing a collation process in which a total of magnitudes of difference vectors between the two motion vectors is calculated and its total is normalized with a length of time or a sample number, thereafter the normalized total is compared with a predetermined threshold and is determined as being collated in a case in which the normalized total is not more than that threshold. As a result of such a process, the motion vector collation processing device 305 outputs, as the output data 314, a TRUE signal in a case in which it is determined as collated, and a FALSE signal in any other cases.

In the image analysis processing of the image analysis processing device 304 in this case, a detection accuracy of a position based on an image of the monitoring camera 301 when a human figure is included in the image as a small size decreases as compared to a case in which the human figure is included in the image as a large size. This means that when a unit pixel of the monitoring camera is back projected on the floor surface, the reliability changes in inverse proportion to its area. Hence, the motion vector collation processing device 305, when the output sequence from the motion vector estimation processing device 303 collates with the output sequence from the image analysis processing device 304, carries out the collation processing upon determining a weighting factor in accordance with an area of the unit pixel of the image of the monitoring camera projected on the floor surface at the position of the feet of the moving body estimated from the image of the monitoring camera.

In this case, in the collation processing, the weighting factor is made smaller as the area of the unit pixel is projected larger, and the weighting factor is made greater as the area of the unit pixel is projected smaller. Such a process can be similarly carried out in the embodiment of the moving body positioning device described with reference to FIG. 4. Namely, in this case, the motion velocity vector collation processing device 205, when the output sequence from the motion velocity vector estimation processing device 203 is collated with the output sequence from the image analysis processing device 204, carries out the collation upon determining the weighting factor in response to an area of the unit pixel of the image of the monitoring camera projected on the floor surface of the position of the feet of the moving body estimated from the image of the monitoring camera.

Figure 6:
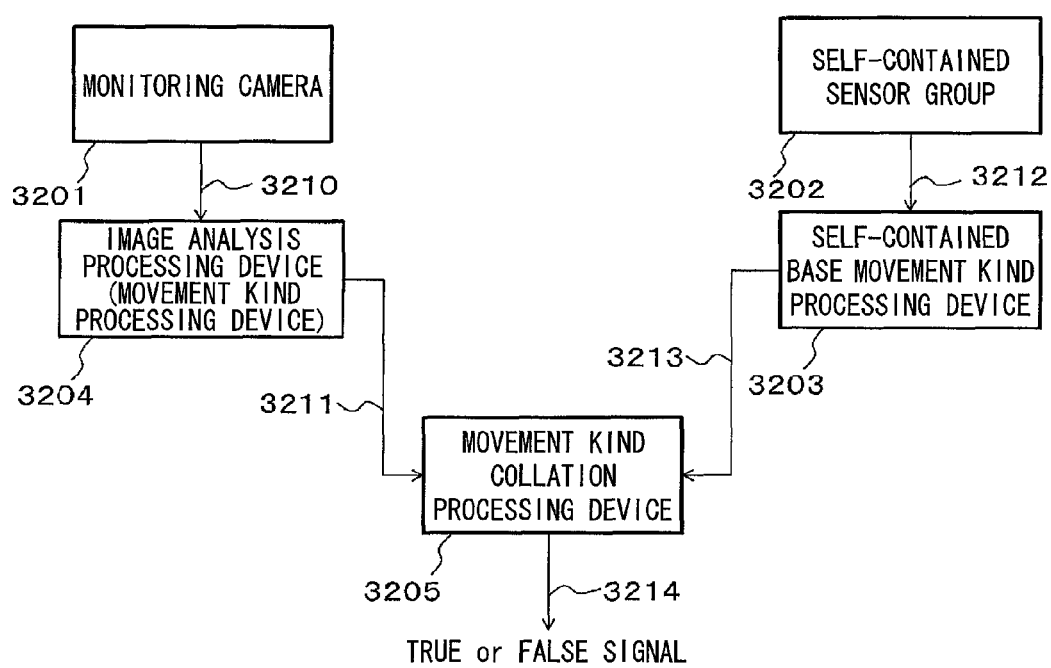
FIG. 6 is a block diagram illustrating a configuration of another embodiment of the moving body positioning device according to the present invention.

FIG. 6 is a block diagram describing a configuration of another embodiment of the moving body positioning device of the present invention. The embodiment described in FIG. 6 is an embodiment in which, based on observation data by the internal observation device and external observation device, a self-contained base movement kind processing device, which is the internal observation data processing device, and an image analysis processing device, which is the external observation data processing device, identify a movement kind of the moving body, and collates the time series data of the identification result in the collation processing device.

In FIG. 6, 3201 is a monitoring camera, 3202 is a self-contained sensor group, 3203 is a self-contained base movement kind processing device, 3204 is an image analysis processing device (motion type processing device), and 3205 is a movement kind collation processing device. The monitoring camera 3201 corresponds to the external observation device 21 in FIG. 2, and is as with the monitoring cameras 201 and 301. The monitoring camera 3201 outputs a time-attached image signal 3210. The image analysis processing device (movement kind processing device) 3204 receives the time-attached image signal 3210 as input, analyzes the movement of the moving body (human figure or the like) included in the image, and recognizes and identifies movements thereof. Several methods of known image processing and computer vision such as HMM (Hidden Markov Model) are available as methods of recognizing the movement kinds of the human figure, and recognition may be achieved by use of this method. Upon identifying the movement kind of the moving body, its identification result 3211 of the movement kind is outputted.

On the other hand, the self-contained sensor group 3202 corresponds to the internal observation device 22 in FIG. 2, and is as with the self-contained sensor groups 202 and 302. The output data 3212 outputted from the self-contained sensor group 3202 is an output sequence of sensor data such as an acceleration vector, an angular velocity vector, a magnetic vector, pressure data, temperature data, each to which a time stamp is attached.

The self-contained base movement kind processing device 3203 identifies and recognizes a movement kind of the person wearing the self-contained sensor group 3202, based on the output data 3212. Such a movement kind processing device, for example, calculates (i) features vector of a time region of time series data such as the acceleration vector and the angular velocity vector that are part of the output from the self-contained sensor group, and (ii) features vector in a frequency region of the time series data converted by Fourier transformation. The movement kinds corresponding to the combination of the two features vectors, of the time region and of the frequency region, can be identified and recognized by a method of machine learning with use of a calculator. Examples of frameworks of the machine learning include AdaBoost (Adaptive Boosting), DP (Dynamic Programming) matching, and SVM (Support Vector Machine); by collating the received time series sensor data with learnt models or role model data with use of results of the machine learning of the data collected beforehand or actively collected by such a framework, it is possible to add to the input sensor data a specific identification result. By use of this method, it is possible to output (3213) time series data of an identification result of the movement kind.

The movement kind collation processing device 3205 corresponds to the collation processing device 25 in FIG. 2, and collates time series data of the two movement kind recognition results based on the output 3211 of the motion type processing device 3204 and the output 3213 of the self-contained base movement kind processing device 3203. At this time, a distance scale between the time scale movement kind recognition result data is defined, and when this distance is not more than a set threshold, a TRUE signal is outputted as the two time series data being collated to each other, and in any other case, a FALSE signal is outputted (3214).

Figure 7:
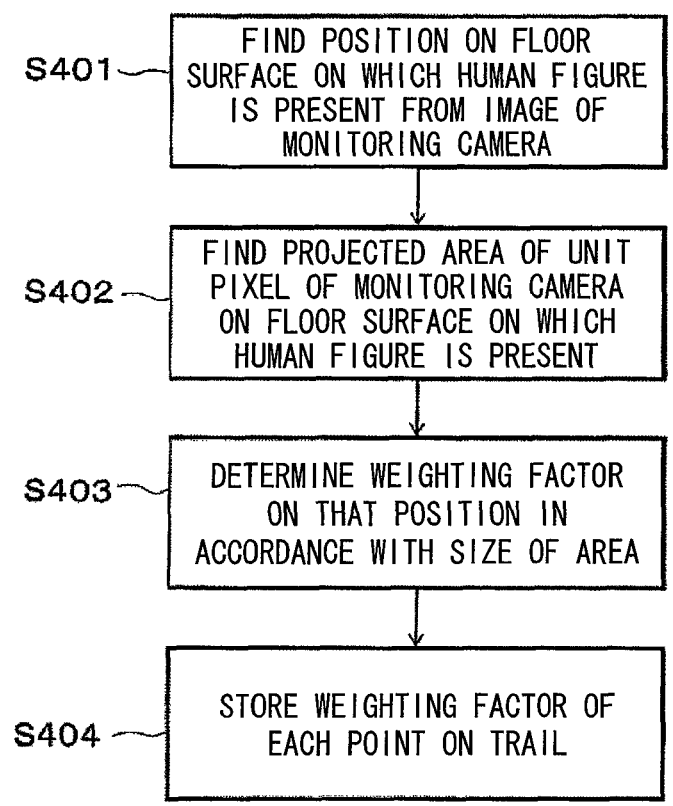
FIG. 7 is a flowchart describing a series of processes for setting a weighting factor in a collation process carried out by a motion velocity vector collation processing device or a motion vector collation processing device.

FIG. 7 is a flow chart describing processes of setting a weighting factor in the collation process carried out by the motion velocity vector collation processing device or the motion vector collation processing device. These processes are described below, with reference to FIG. 7. In this process, a position on the floor surface on which the human figure is present is found in the image of the monitoring camera in step S401, and subsequently in step S402, an area of which the unit pixel of the monitoring camera is projected on the floor surface on which the human figure is present is calculated. Thereafter, in the subsequent step S403, the weighting factor at that position is determined in accordance with the area calculated, and in step S404, the weighting factors for each of points on its trail is stored. The weighting factors are determined as such, to carry out the collation process.

Moreover, the moving body positioning device of the present invention may be modified so that an individual difference parameter is set, thereby allowing for improving the accuracy of the data processing in the estimation process. In this case, when the image of the monitoring camera is collated with the output of the self-contained sensor, the individual difference parameter is set by estimating an individual difference parameter that would characterize a walking movement of the human figure wearing the self-contained sensor, with use of the motion velocity vector of the human figure in the image and the output sequence of the self-contained sensor.

When the motion velocity vector or the motion vector of the human figure inside the image of the monitoring camera is associated with the motion velocity vector or the motion vector estimated in accordance with sensor data based on the self-contained sensor group, it is possible to associate the output sequence of the motion velocity vector of the human figure in the image of the monitoring camera with the output sequence of the sensor data of the self-contained sensor group. Accordingly, as also described in Non Patent Literature 1, for example, amplitude data of an acceleration component obtained by decomposing the output of the acceleration sensor in a vertical direction is associated with a magnitude of the motion velocity vector of the human figure in the image, to estimate an individual difference parameter (in the embodiment, a slope and intercept that determine a straight line) of that human figure (i.e. person wearing the self-contained sensor group).

Figure 8:
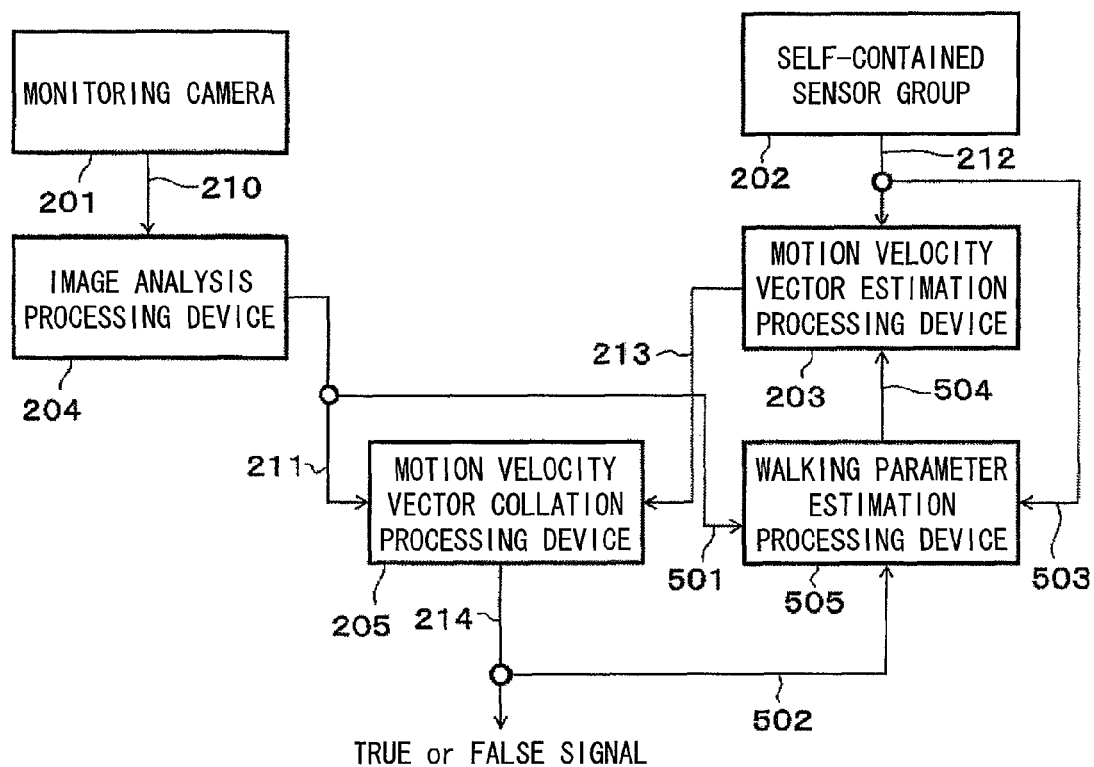
FIG. 8 is a block diagram illustrating a configuration of another embodiment of the moving body positioning device of the present invention.

Such an embodiment is described with reference to FIG. 8. FIG. 8 is a block diagram illustrating a configuration of another embodiment of the moving body positioning device according to the present invention. In FIG. 8, 201 is a monitoring camera, 202 is a self-contained sensor group, 203 is a motion velocity vector estimation processing device, 204 is an image analysis processing device, and 205 is a motion velocity vector collation processing device. These components are as with those described with reference to FIG. 2. In the embodiment, the configuration further includes a walking parameter estimation processing device 505.

The walking parameter estimation processing device 505 receives the sensor data 503 outputted from the self-contained sensor group 202, the motion velocity vector 501 of the position of the feet of the human figure inside the image, outputted from the image analysis processing device 204, and further the output signal 502 of a collation result (TRUE/FALSE) outputted as a result of the collation process by the motion velocity vector collation processing device 205, and estimates and outputs a walking parameter. The estimated output of the walking parameter is inputted into the motion velocity vector estimation processing device 203, and is used when the motion velocity vector estimation processing device 203 carries out the estimation process of the motion velocity vector.

Namely, the process of estimating the walking parameter carried out by the walking parameter estimation processing device 505 is a process in which, when the motion velocity vector of the human figure in the image is collated with the motion velocity vector based on the sensor data of the self-contained sensor (i.e. when the signal 502 is a TRUE signal), the walking parameter estimation processing device estimates, based on the sensor data 503 of the self-contained sensor data and the motion velocity vector 501 associated at that time, a walking parameter characterizing the walking movement of the person wearing the self-contained sensor, and outputs the data of that walking parameter. The outputted walking parameter characterizing the individual difference is, as described above, used when the motion velocity vector estimation processing device 203 carries out the estimation process of the motion velocity vector.

The walking parameter estimation processing device 505 provided in the moving body positioning device illustrated in FIG. 8 resets the walking parameter of the individual difference parameter in the motion velocity vector estimation processing device 203 when the motion velocity vector collation processing device 205 outputs a TRUE signal as the output data 214 of the collation process, with use of pair information of time series data of the collated motion velocity vector and the output sequence of sensor data of the self-contained sensor. Hence, the motion velocity vector estimation processing device 203 corrects and outputs the output sequence of the motion velocity vector, in accordance with the walking parameter of the set individual difference parameter.

Moreover, the moving body positioning device according to the present invention may be modified so that when the image of the monitoring camera is collated with the output of the self-contained sensor, identification information of the person wearing the self-contained sensor is associated with the human figure in the image, and this identification information is stored and displayed. An embodiment of such a configuration is described with reference to FIG. 9.

Figure 9:
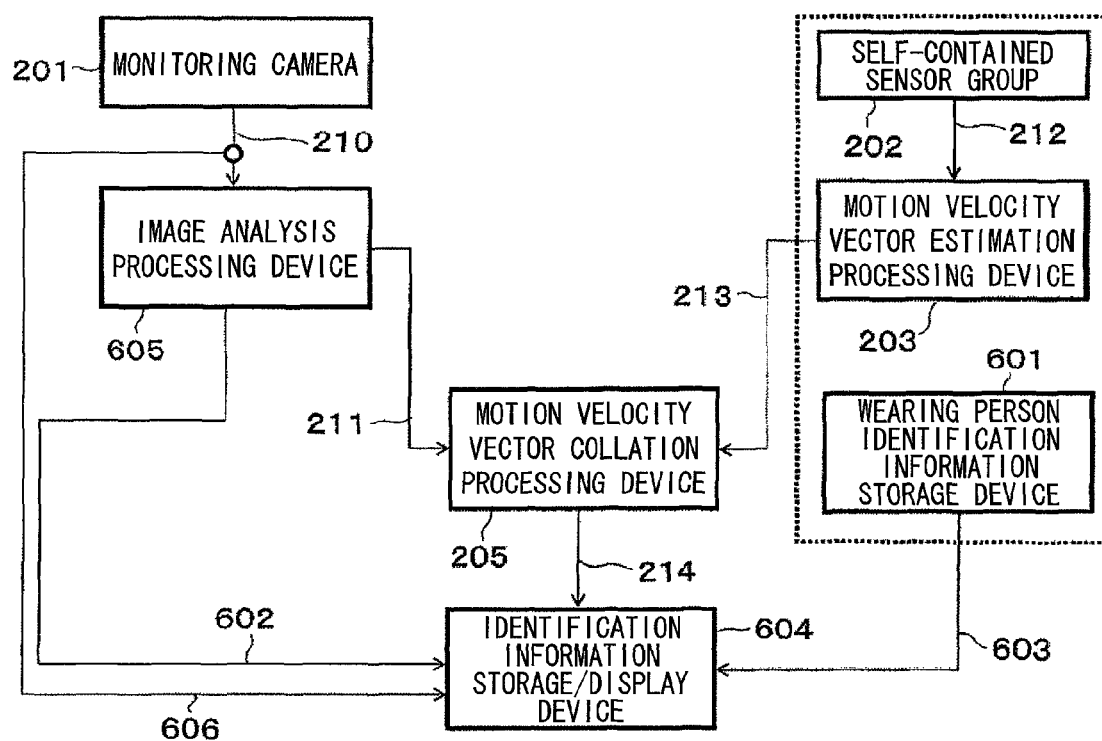
FIG. 9 is a block diagram illustrating a configuration of another embodiment of the moving body positioning device of the present invention.

FIG. 9 is a block diagram illustrating a configuration of another embodiment of the moving body positioning device of the present invention. In FIG. 9, 201 is a monitoring camera, 202 is a self-contained sensor group, 203 is a motion velocity vector estimation processing device, and 205 is a motion velocity vector collation processing device. Furthermore, 601 is a wearing person identification information storage device, 604 is an identification information storage/display device, and 605 is an image analysis processing device.

The wearing person identification information storage device 601 is a device that stores and outputs identification information (information such as an individual ID and name) of a person that wears the self-contained sensor group. An output 603 of the identification information is identification information of the person wearing the self-contained sensor group 202. The image analysis processing device 605 here analyzes an image from the monitoring camera 201, estimates a motion velocity vector of a position of the feet of the human figure, and outputs its output data 211. Simultaneously, the image analysis processing device 605 outputs output data 602 of region information in which the human figure is included.

The output data 602 of the region information is information indicative of a region of the human figure in the image. Moreover, 606 is output data 606 of a frame image of an image taken out from the output data 210 outputted from the monitoring camera 201, and is inputted into the identification information storage/display device 604.

The identification information storage/display device 604 receives, as input, the frame image 606, the region information 602 of the human figure in the image, the identification information 603 of a person mounting the self-contained sensor group 202, and a TRUE/FALSE signal 214 which is a result of a collation determination process of the two motion velocity vectors, which result is the output of the motion velocity vector collation processing device 205. When the signal of the result of the collation determination process is the TRUE signal, the region information 602 of the frame image 606 of the monitoring camera is stored associated with the identification information 603 of the wearing person, and the identification information 603 is displayed on the image region indicated by the region information in the frame image.

As a result, in the moving body positioning device according to the present invention, when the motion velocity vector or motion vector of the human figure in the image of the monitoring camera is associated with the motion velocity vector or motion vector estimated based on the sensor data according to the self-contained sensor group, the human figure in the image of the monitoring camera may be associated with the identification information of the person wearing the self-contained sensor group, and display these information.

The moving body positioning device of the embodiment includes an identification information storage/display device 604 that stores and displays identification information identifying a moving body; when the motion velocity vector collation processing device 205 outputs a TRUE signal, the identification information storage/display device 604 stores and displays identification information of a moving body that wears the self-contained sensor 202 as information indicative of the moving body in the image of the monitoring camera 201, and when the motion velocity vector collation processing device 205 outputs a FALSE signal, the identification information storage/display device 604 stores and displays identification information indicating that no self-contained sensor is worn, as the information indicative of the moving body in the image of the monitoring camera 201.

Moreover, in the moving body positioning device according to the present invention, when the motion velocity vector or motion vector of the human figure in the image of the monitoring camera is associated with a motion velocity vector or motion vector estimated based on the sensor data according to the self-contained sensor group, it is possible to estimate with a certain probability that a person wearing the self-contained sensor group is present at a position on which a human figure is present, based on an image analysis of the monitoring camera.

In this case, when the image of the monitoring camera is collated with the output of the self-contained sensor, the position of the person wearing the self-contained sensor group is corrected to the position of the image analysis result. The position correction signal used at this time is outputted from the position correction signal output device 702.

FIG. 10 is a block diagram illustrating a configuration of another embodiment of the moving body positioning device of the present invention. In FIG. 10, 201 is a monitoring camera, 202 is a self-contained sensor group, 203 is a motion velocity vector estimation processing device, 204 is an image analysis processing device, and 205 is a motion velocity vector collation processing device. These components are configured similarly to the configuration of the embodiment of the moving body positioning device described with reference to FIG. 2. The 702 is a position correction signal output device.

The position correction signal output device 702 receives, as its input, positional information 701 of the feet of the human figure in the image, which is one output of the image analysis processing device 204, and a signal (TRUE/FALSE signal) 214 of a collation result, which is an output of the motion velocity collation processing device 205, and outputs the position correction signal 703. The position correction signal 703 is used as a correction signal for an image analysis signal 701 outputted from the image analysis processing device 204. The position correction signal output device 702, when the motion velocity vector collation processing device 205 outputs a TRUE signal, outputs a positional coordinate of the moving body that is outputted from the image analysis processing device 204 as a signal for correcting as a position of the moving body on which the self-contained sensor group is worn.

INDUSTRIAL APPLICABILITY

A moving body positioning device of the present invention allows for correcting a position estimation result obtained by an internal observation device provided to a moving body with use of an external observation device such as a monitoring camera, thereby making it possible to measure, analyze, and estimate movement of a moving body more accurately. Accordingly, the moving body positioning device of the present invention is useful in an industrial manner.

REFERENCE SIGNS LIST 11 external observation device
12 internal observation device
21 external observation device
22 internal observation device
23 internal observation data processing device
24 external observation data processing device
25 collation processing device
101 monitoring camera
102 self-contained sensor group
201 monitoring camera
202 self-contained sensor group
203 motion velocity vector estimation processing device
204 image analysis processing device
205 motion velocity vector collation processing device
301 monitoring camera
302 self-contained sensor group
303 motion vector estimation processing device
304 image analysis processing device
305 motion vector collation processing device
505 walking parameter estimation processing device
601 wearing person identification information storage device
604 identification information storage/display device
605 image analysis processing device
702 position correction signal output device
3201 monitoring camera
3202 self-contained sensor group
3203 self-contained base movement kind processing device
3204 image analysis processing device
3205 movement kind collation processing device

The invention claimed is:

1. A moving body positioning device, comprising:
an internal observation device provided to a moving body, to measure and output a motion of the moving body;
an internal observation data processing device that estimates a motion of the moving body based on the output from the internal observation device;
an external observation device that observes motion of a plurality of moving bodies;
an external observation data processing device that estimates a motion of the moving body from an observation result by the external observation device; and
a collation processing device that collates a first output from the internal observation data processing device with a second output of the external observation data processing device, and outputs its collation result as a TRUE signal when the first output matches the second output or a FALSE signal when the first output does not match the second output,
the internal observation device includes a self-contained sensor group that outputs an acceleration vector of the moving body, the acceleration vector being obtained with use of an acceleration sensor provided in the moving body,
the internal observation data processing device is a self-contained sensor base motion identification processing device that identifies a movement kind of the moving body in accordance with an output of the self-contained sensor group, and outputs an identification result indicating the movement kind together with a measured time,
the external observation device includes a monitoring camera for externally image capturing the moving bodies,
the external observation data processing device is an image analysis processing device that analyzes an image of the monitoring camera to identify the movement kind of the moving body in the image and outputs its identification result together with a measured time, and
the collation processing device is a movement kind collation processing device that collates the output of the self-contained sensor base motion identification processing device with the output of the image analysis processing device, and outputs its collation result as a TRUE signal or a FALSE signal.

2. A moving body positioning device comprising:
an internal observation device provided to a moving body, to measure and output a motion of the moving body;
an internal observation data processing device that estimates a motion of the moving body on the output from the internal observation device;
an external observation device that observes motion of a plurality of moving bodies;
an external observation data processing device that estimates a motion of the moving body from an observation result by the external observation device; and
a collation processing device that collates a first output from the internal observation data processing device with a second output of the external observation data processing device, and outputs its collation result as TRUE signal when the first output matches the second output or a FALSE signal when the first output does not match the second output,
the internal observation device includes a self-contained sensor group that outputs an acceleration vector of the moving body with use of an acceleration sensor provided in the moving body,
the internal observation data processing device is a motion velocity vector estimation processing device that measures a motion velocity vector based on an output of the self-contained sensor group, and outputs an output sequence of the motion velocity vector together with a measured time, the external observation device includes a monitoring camera for externally image capturing the moving bodies, the external observation data processing device analyzes an image of the monitoring camera to measure a position of feet of the moving body in the image to measure a motion velocity vector of that position of the feet, and outputs an output sequence of the motion velocity vector together with a measured time, and the collation processing device is a motion velocity vector collation processing device that collates the output sequence of the motion velocity vector estimation processing device with the output sequence of the image analysis processing device, and outputs its collation result as a TRUE signal or a FALSE signal, when the collation processing device collates the output sequence from the internal observation data processing device with the output sequence from the external observation data processing device, the collation processing device determines a weighting factor in accordance with a size of an area of a unit pixel of the image of the monitoring camera projected on a floor surface at the position of the feet of the moving body estimated from the image of the monitoring camera, to carry out the collation process.

3. The moving body positioning device recited in claim 2, wherein in the collation process, the weighting factor is made smaller as the area of the unit pixel is projected larger, and the weighting factor is made larger as the area of the unit pixel is projected smaller.

4. A moving body positioning device comprising:

an internal observation device provided to a moving body, to measure and output a motion of the moving body;

an internal observation data processing device that estimates a motion of the moving body based on the output from the internal observation device;

an external observation device that observes motion of a plurality of moving bodies;

an external observation data processing device that estimates a motion of the moving body from an observation result by the external observation device; and a collation processing device that collates a first output from the internal observation data processing device with a second output of the external observation data processing device, and outputs its collation result as a TRUE signal when the first output matches the second output or a FALSE signal when the first output does not match the second output, the internal observation device includes a self-contained sensor group that outputs an acceleration vector of the moving body with use of an acceleration sensor provided in the moving body, the internal observation data processing device is a motion velocity vector estimation processing device that measures a motion velocity vector based on an output of the self-contained sensor group, and outputs an output sequence of the motion velocity vector together with a measured time, the external observation device includes a monitoring camera for externally image capturing the moving bodies, the external observation data processing device analyzes an image of the monitoring camera to measure a position of feet of the moving body in the image to measure a motion velocity vector of that position of the feet, and outputs an output sequence of the motion velocity vector together with a measured time, and the collation processing device is a motion velocity vector collation processing device that collates the output sequence of the motion velocity vector estimation processing device with the output sequence of the image analysis processing device, and outputs its collation result as a TRUE signal or a FALSE signal, the moving body positioning device further comprising a position correction signal output device, when the collation processing device outputs the TRUE signal, the position correction signal output device outputting a signal that corrects a positional coordinate of the moving body to a position of the moving body wearing the self-contained sensor group, the positional coordinate being outputted from the external observation data processing device.

* * * * *